(12) United States Patent
Ohashi et al.

(10) Patent No.: US 6,362,980 B1
(45) Date of Patent: Mar. 26, 2002

(54) ACTIVE FILTER FOR COMPUTER, FILTER MODULE, POWER MODULE AND COMPUTER

(75) Inventors: Kazuo Ohashi; Keiji Suzuki, both of Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/728,795

(22) Filed: Dec. 1, 2000

(30) Foreign Application Priority Data

Dec. 1, 1999 (JP) ............................................. 11-342467

(51) Int. Cl.[7] .......................................... H02M 3/335
(52) U.S. Cl. ................................. 363/21.01; 363/21.07
(58) Field of Search ....................... 363/16, 20, 21.01, 363/21.04, 21.07, 21.12, 21.15, 95, 97, 131; 365/226, 227, 229

(56) References Cited

U.S. PATENT DOCUMENTS

| | | | | |
|---|---|---|---|---|
| 5,134,355 A | * | 7/1992 | Hastings | ................. 323/211 |
| 5,960,207 A | * | 9/1999 | Brown | ................. 395/750.01 |
| 6,052,291 A | * | 4/2000 | Suzuki et al. | ................. 363/21 |
| 6,232,964 B1 | * | 5/2001 | Lee | ................. 345/211 |

* cited by examiner

Primary Examiner—Matthew Nguyen
(74) Attorney, Agent, or Firm—J. Bruce Schelkopf

(57) ABSTRACT

A signal PWR is driven into a low level in response to a power-off command from the computer, then the low level PWR signal is entered to an input terminal 36 of a switching circuit 130 and regulators 152 to 156 respectively. Consequently, the regulators come to rest and thereby the power supply to the computer is shut off. Receiving the low level PWR signal, a photo-coupler 134 and a transistor 132 in the switching circuit 130 are turned off respectively, as well as the operation of a power factor correction circuitry is stopped. Consequently, an AC power factor correction circuitry comes to rest when the power supply to the computer is shut off, and thereby the power consumption of the computer can be reduced.

9 Claims, 5 Drawing Sheets

[Figure 1]
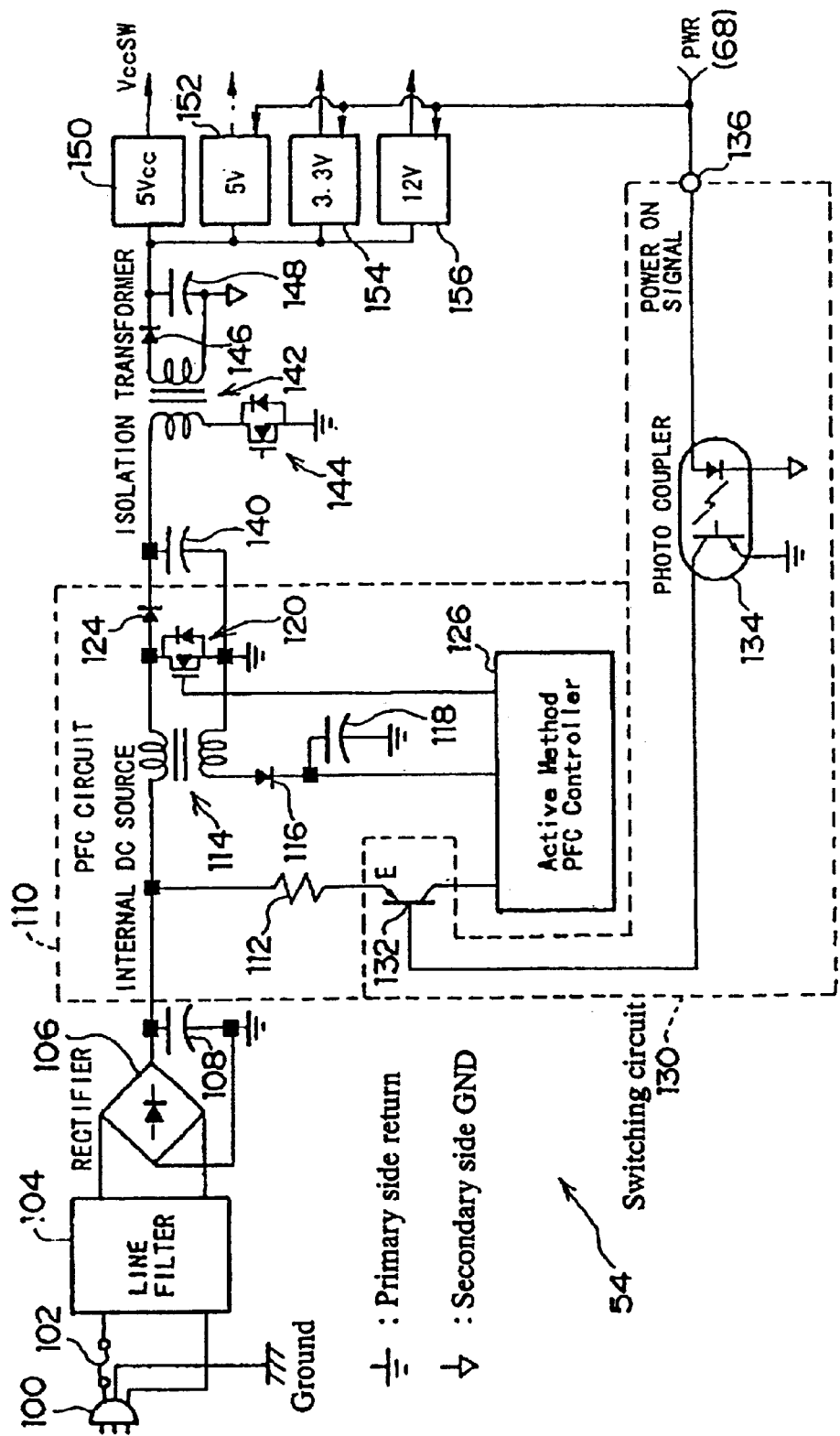

[Figure 2]
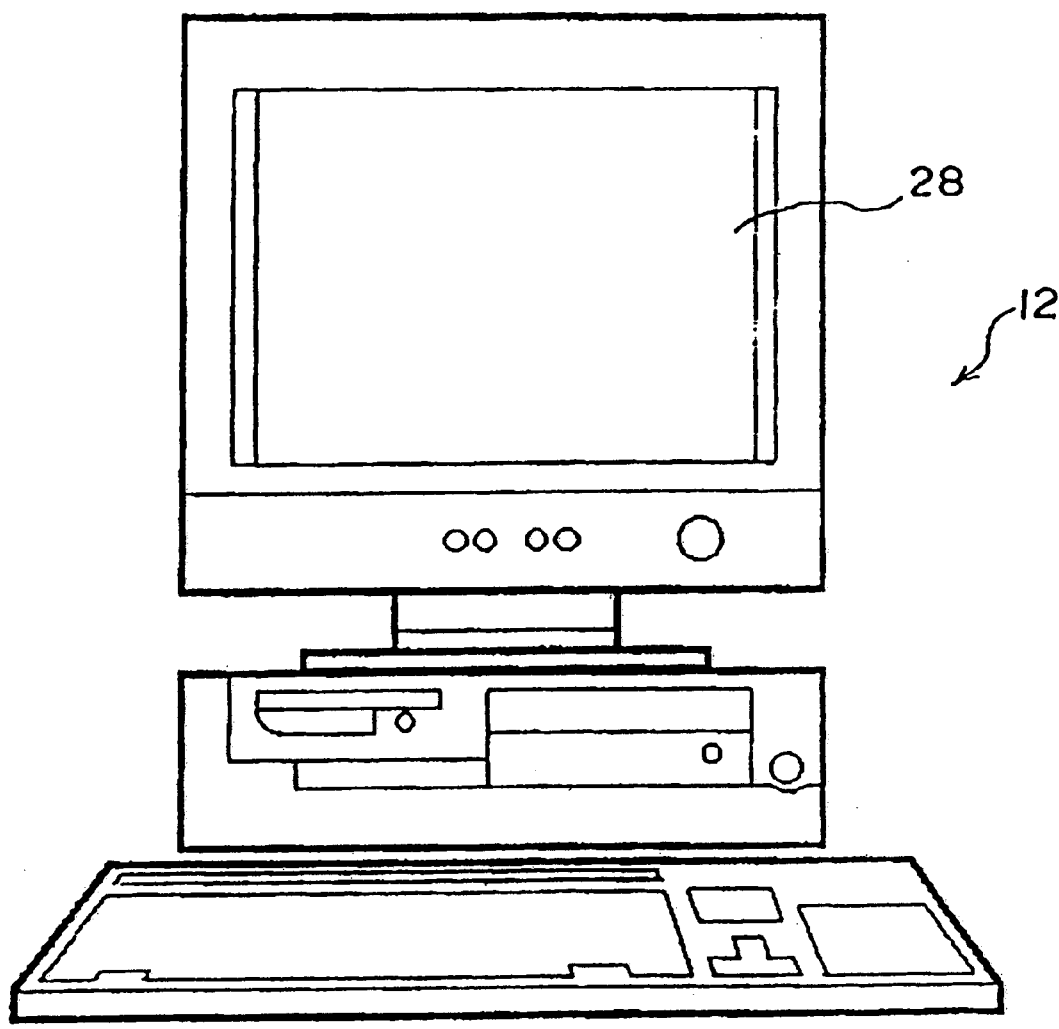

[Figure 3]
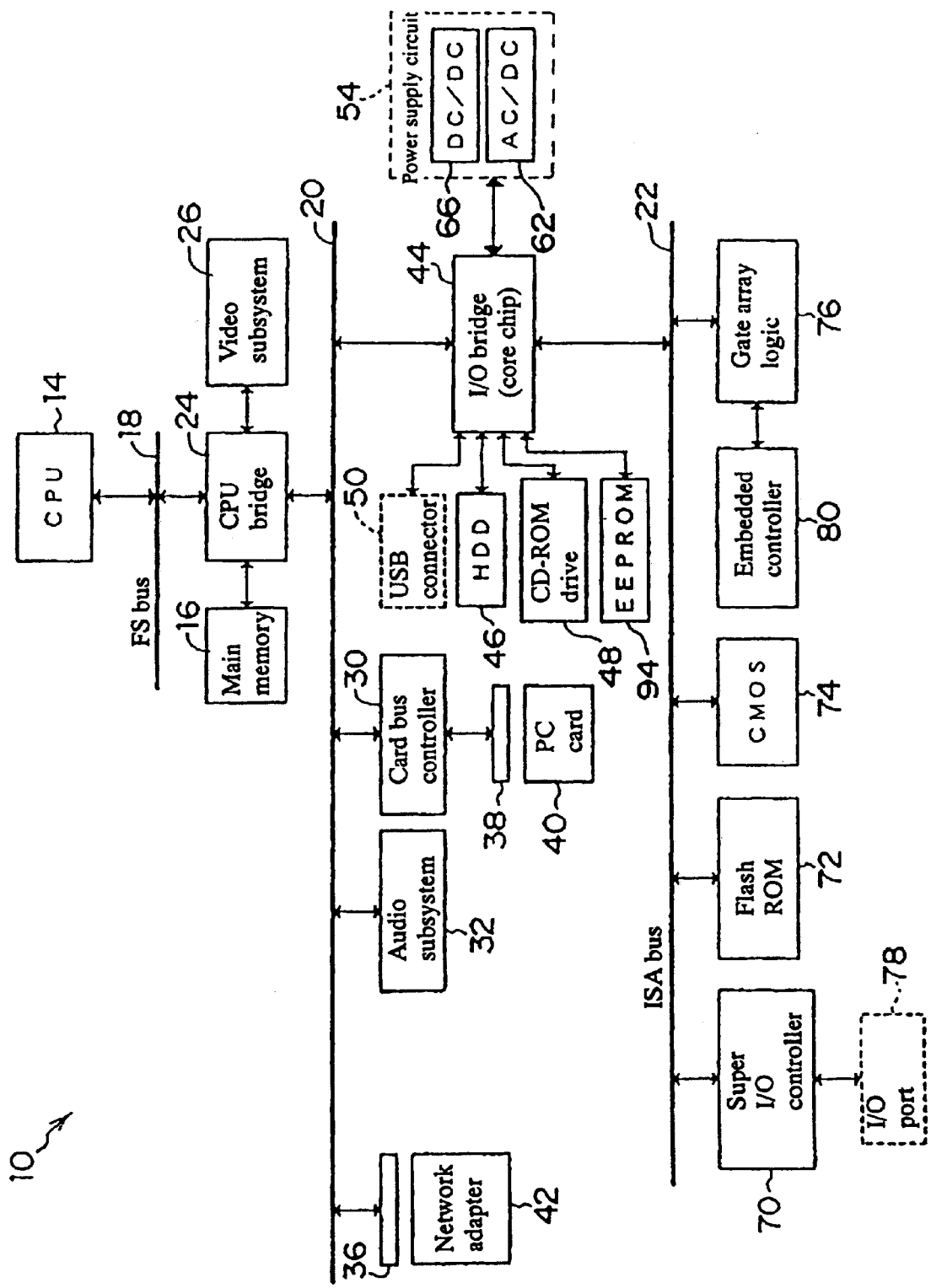

[Figure 4]
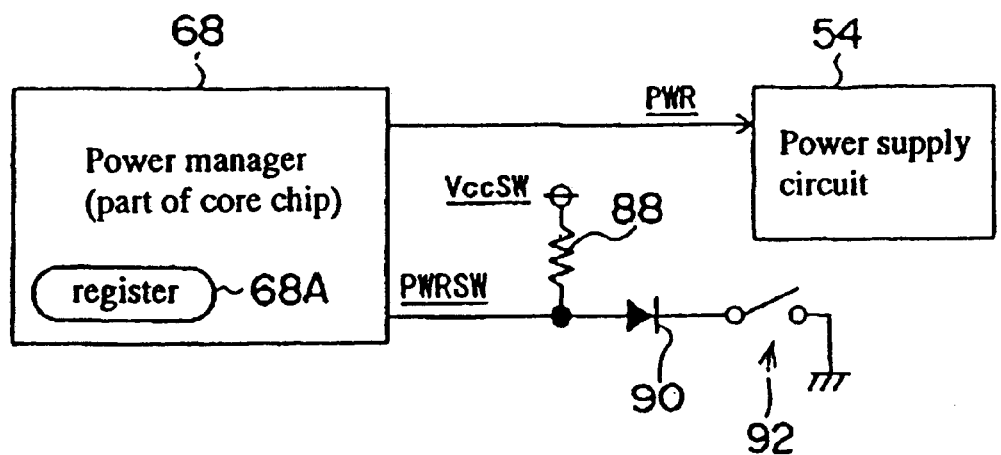

[Figure 5]
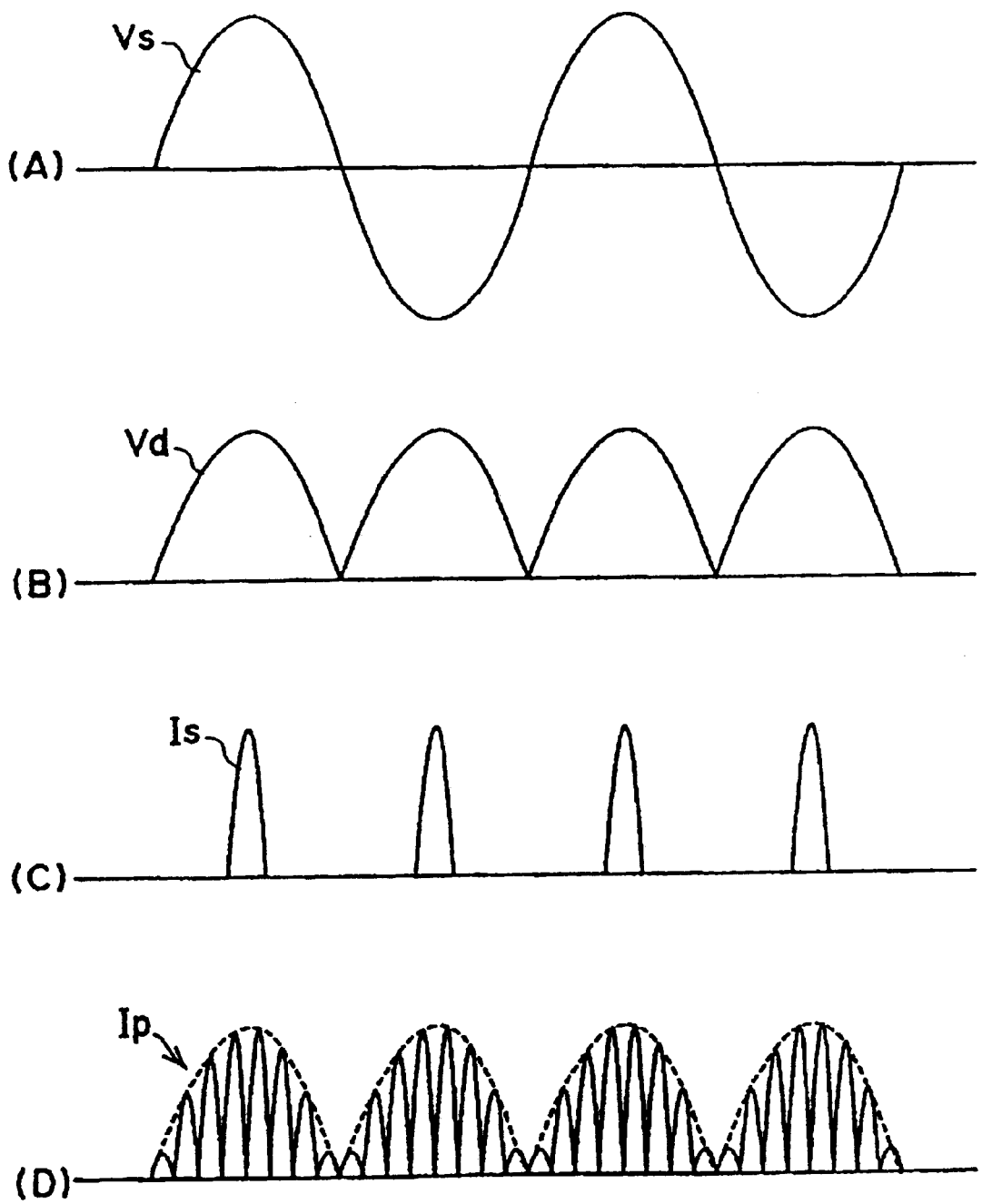

ACTIVE FILTER FOR COMPUTER, FILTER MODULE, POWER MODULE AND COMPUTER

BACKGROUND OF THE INVENTION

A personal computer (PC) is provided with a chip (core chip) having a logic (state machine) for managing the power state thereof including operations of internal registers for storing the current power state of the PC. The state machine of the core chip is used to manage the power state of the PC including ON/OFF of the power supply. The interface (I/F) provided with the core chip state machine is standardized now. For a PC conforming to the ACPI (Advanced Configuration and Power Interface), an operating system (OS) is used to control the I/F provided with the state machine. The power supply of such the PC is turned off in response to a POWER OFF command issued to the power supply unit via the state machine after various termination processings related to the power off are executed by the OS.

Usually, therefore, such a power shut-off processing is executed in response to a power-on or power-off command issued from the OS or due to an ON/OFF operation of the power switch after a start-up including a power-on or termination processing; the power supply is not turned on nor turned off by the ON/OFF operation of the power switch.

By the way, a PC rectifies an AC power supplied from an AC power source and generates a DC voltage appropriate to itself from the rectified power (voltage) with use of various regulators. Concretely, the PC has various power sources used in itself. For example, the electric circuitry uses a plurality of such power sources as 5V, 3.3V, 12V, etc. These power sources are often provided as separated power sources to be turned on/off in an energy-saving mode for enabling those power sources to be turned off when the PC is in the off state and turned on as needed. Consequently, the PC executes such a power shut-off processing after a start-up processing including a power-on or termination processing for each of a plurality of such power sources as 5V, 3.3V, etc. in response to a power-on or power-off command issued from the OS and due to a power switch ON/OFF operation. Those power sources (5V, 3.3V, etc.) are used for the above described electronic circuitry. However, because a power supply unit used to obtain those DC powers from an AC power causes the size of the whole apparatus to be expanded, part of each power source, before its electric power is rectified once, is often provided as a power module.

And generally, a PC uses a voltage generated on the secondary winding when an AC voltage from an AC power source is rectified for full waves and the full-wave rectified voltage is supplied to the primary winding of a transformer so as to generate various DC voltages used for the PC itself. As known well, if a full-wave rectified voltage is supplied to the primary winding of a transformer so as to generate a voltage on the secondary winding, the efficiency is degraded. This is why the power factor is improved (refer to the official gazette of Published Unexamined Patent Application No. 9-9626). A circuitry used for this power factor correction (hereafter, to be referred to as a power factor correction circuitry) is provided between the input side of the AC power source and the above described transformer.

As described above, a PC executes a power shut-off processing after a start-up processing including a power-on or termination processing in response to a power-on or power-off command generated from the OS or due to an on/off operation of the power switch. However, a power source actuated by such a start-up processing and a power shut-off processing is used for various regulators that convert a voltage generated on the secondary winding of the transformer to a voltage usable by the PC respectively. Consequently, an electric power is kept supplied to the power factor correction circuitry.

This is why a voltage is kept generated on the secondary winding by supplying the full-wave rectified voltage to the primary winding of the transformer. Consequently, the electric power is kept consumed due to the operation of the power factor correction circuitry. And, this is why it has not been possible to reduce the power consumption in the power supply unit including the power factor correction circuitry even when the PC is in the off state.

Under such circumstances, it is an object of the present invention to provide an active filter used for a computer, which can reduce a power consumption under certain conditions such as power off and can conform to the regulated values of power line harmonics of various countries, as well as a filter module, a power module, and a computer.

BRIEF SUMMARY OF THE INVENTION

The active filter of the present invention used for a computer includes a power factor correction circuitry and enabling means. The power factor correction circuitry supplies an electric power rectified from an AC input to the primary winding of a transformer intermittently so as to supply an electric power generated on the secondary winding of the transformer to the computer. Consequently, a voltage whose power factor is improved is generated on the secondary winding of the transformer. Concretely, the power factor as an electric power load observed from the AC power supply side is improved.

The computer of the present invention outputs a command signal so as to turn on/off a power source. The command signal directs supply of an electric power to the computer and it includes a signal for turning on/off an object power source. This command signal is entered via input means provided in enabling means. If the input means receives a command signal for supplying an electric power to the computer, the enabling means actuates the power factor correction circuitry. Consequently, the power factor correction circuitry is actuated only when receiving a command signal for directing supply of the electric power to the computer from the computer. It is thus possible to reduce the power consumption in the power factor correction circuitry, because the power factor correction circuitry is in the off state when no power supply is required for the computer.

The enabling means, when receiving a shut-off signal as the command signal for shutting off supply of an electric power to the computer, can stop the operation of the power factor correction circuitry. Concretely, when the command signal is a shut-off signal for directing shutting off of supply of an electric power to the computer, the enabling means becomes positive to stop the operation of the power factor correction circuitry, thereby reducing the power consumption in the power factor correction circuitry.

The present invention also provides a filter module formed so as to have the power factor correction circuitry and the enabling means in one and the same chip. Consequently, the present invention can improve the power factor with use of the chip and provide a filter module that can reduce the power consumption in the filter module.

The power module of the present invention includes a rectifier circuit for rectifying an AC input and this rectifier circuit outputs a rectified electric power. This rectified electric power is supplied to the primary winding of the transformer intermittently from the power factor correction circuitry, thereby the power factor is improved. The transformer is included in power supply means and this power supply means supplies an electric power generated on the secondary winding of the transformer to the computer. The power factor correction circuitry is actuated only when the input means receives an command signal for directing supply of an electric power to the computer. Consequently, the power factor correction circuitry is in the off state when no power supply to the computer is required. The power consumption in the power factor correction circuitry can thus be reduced. The present invention also provides a power module as a single unit, which can reduce the power consumption when the power supply to the computer is turned off.

In the power module, the enabling means can stop the operation of the power factor correction circuitry when receiving a shut-off signal as an command signal for shutting off supply of the electric power to the computer.

The power module can also be built in the computer or housed in an external case. As described above, therefore, the present invention can provide a computer that can reduce the power consumption when the electric power to the computer is turned off.

The computer of the present invention includes a rectifier circuit for rectifying an AC input and this rectifier circuit outputs a rectified electric power. This rectified electric power is supplied to the primary winding of the transformer intermittently from the power factor correction circuitry, thereby the power factor of the computer is improved. The above described transformer is included in power supply means and this power supply means supplies an electric power generated on the secondary winding of the transformer to the computer. The power supply means includes a constant use power source for keeping supply of an electric power generated on the secondary winding of the transformer to the computer and a selective power source for supplying an electric power to the computer when receiving an enabling signal for supplying the electric power to the computer. This constant use power source keeps supply of the minimum electric power to the computer. The power source is just requested to supply such the minimum necessary electric power so as to restore the power supply to the computer in such a mode as the energy-saving mode in response to a command from the OS. The power consumption in the mode is thus reduced to the minimum.

Consequently, a fixed voltage is kept supplied to the computer from the constant use power source. The fixed voltage is of an electric power generated on the secondary winding of the transformer. In addition, another fixed voltage is supplied to the computer from the selective power source only when the enabling signal is entered to the computer. The fixed voltage from the selective power source is of the electric power generated on the secondary winding of the transformer. The power factor correction circuitry is actuated only when the input means receives an command signal for directing supply of an electric power to the computer from the enabling means. When no power supply is directed, therefore, the power factor correction circuitry is set in the off state. Such an electric power is kept supplied only to the constant use power source, which requires no large electric power whose power factor must be improved. Only a minimum necessary electric power is thus supplied to the computer. When no power supply to the computer is directed, the power factor correction circuitry is in the off state and the power consumption in the circuitry can be reduced. The computer of the present invention can thus reduce the power consumption such way when the power of the computer is off.

The above described computer, when receiving a shut-off signal as an command signal for shutting off supply of an electric power to the computer, can stop the operation of the power factor correction circuitry.

The active filter for a computer, the filter module, the power module, and the computer of the present invention may also be composed so that an command signal output when an electric power supplied to the computer exceeds the first value is entered to the input means provided in the enabling means. This first value is predetermined according to the power consumption of the computer and it is a favorable electric power value required when the electric power supplied to the computer begins increasing, thereby the power factor should be improved.

The shut-off signal used as an command signal to be entered to the enabling means may be output when the electric power supplied to the computer is smaller than the second value. This second value is predetermined corresponding to the power consumption of the computer. The value is a favorable value denoting that the electric power supplied to the computer is reduced and thereby the power factor correction is not required. The second value may be the same as that first value or smaller than the first value.

A computer conforming to, for example, the ACPI Standard will be proper as the above described computer of the present invention.

BRIEF DESCRIPTION OF THE DRAWINGS

FIG. 1 is a schematic block diagram of a circumferential configuration of a PFC circuit in the embodiment of the present invention;

FIG. 2 is a perspective external view of a lap-top PC.

FIG. 3 is a schematic block diagram of a computer system in the embodiment of the present invention;

FIG. 4 is a schematic diagram denoting the relationship between a power supply circuit and a power manager; and FIG. 5 is an explanatory chart for power factor correction.

DESCRIPTION OF SYMBOLS

10 . . . Computer System
44 . . . I/O Bridge
54 . . . Power Supply Circuit
68 . . . Power Manager
110 . . . power factor correction Circuitry
130 . . . Switching Circuit
136 . . . Input Terminal

DETAILED DESCRIPTION OF THE INVENTION

Hereunder, the preferred embodiment of the present invention will be described in detail with reference to the accompanying drawings. FIG. 3 shows an explanatory view of a hardware configuration of a computer system 10 composed of a typical personal computer (PC) so as to be preferred to realize the present invention. The hardware configuration is divided into subsystems. A desk-top PC 12 (FIG. 2) in which "Windows98" or "NY" (Microsoft USA) or "OS/2" (IBM USA) is installed as an operating system (OS) is an example of the PC used so as to realize the present invention. The PC also conforms to the OADG (PC Open Architecture Developer's Group) specifications. Hereunder, each part of the computer system 10 will be described.

A CPU 14 is the brain of the whole computer system 10. The CPU 14 executes various programs under the control of the OS. The CPU 14 may be, for example, "Pentium", "MMX Technology Pentium", "Pentium Pro", which are the CPU chips of Intel Inc., USA, or any CPU of such other companies as AMD Inc. It may also be "PowerPC" (IBM Inc., USA). The CPU 14 is composed so as to include an L2 (Level 2) cache, which is a fast operation memory for storing only some of limited codes and data that are frequently accessed temporarily, thereby reducing the total access time to the main memory 16. Generally, the L2 cache is composed of an SRAM (Static RAM) chip and its capacity is, for example, 512 KB or over.

The CPU 14 is connected to each hardware component (to be described later) via three layers of buses; an FS (FrontSide) bus 18, which is directly connected to the processor connected directly to the external pin thereof; a PCI (Peripheral Component Interconnect) bus 20 used for fast I/O devices; and an ISA (Industry Standard Architecture) bus 22 used for slow I/O devices.

The FSB 18 and the PCI bus 20 are short-circuited by a CPU bridge (host-PCI bridge) 24 referred to generally as a memory/PCI control chip. The CPU bridge 24 in this embodiment is composed so as to include memory controller functions for controlling accesses to the main memory 16 and a data buffer, etc. for compensating a difference in data transfer rate between the FSB 18 and the PCI bus 20. For example, the CPU bridge 24 may be a 440BX (Intel USA) or the like.

The main memory 16 is a writable memory used as an area for reading programs executed in the CPU 14 or a work area for writing data to be processed by execution programs. The main memory 16 is usually composed of a plurality of DRAM (dynamic RAM) chips. For example, the main memory 16 has a capacity of 32 MB as standard and it can be expanded up to 256 MB. And, in recent years, the DRAM is shifted to the fast page DRAM, the EDO, the DRAM, the synchronous DRAM (SDRAM), the burst EDO, the DRAM, the RDRAM, etc. in order to fulfill the requirement of speeding up.

The execution programs described above include such operating systems (OS) as Windows98, etc., various device drivers for operating peripheral devices, application programs dedicated to specific business works, such firmware as BIOS (Basic Input/Output System: programs for controlling input/output operations of such hardware items as a keyboard, floppy disk drive, etc.), etc. which is stored in a flash ROM 72.

The PCI bus 20 enables data to be transferred at a comparatively fast rate (for example, bus width: 32/64 bits, max. operation frequency: 33/66/100 MHz, max. data transfer rate: 132/264 MBps). The PCI bus 20 is connected to such PCI devices driven comparatively fast as a card bus controller 30. The PCI architecture is originated from a proposal of Intel Inc., USA and it realizes a so-called PnP (plug and play) function.

The video subsystem 26 is used to realize video related functions. It includes a video controller that processes drawing instructions from the CPU 14, writes processed drawing information in a video memory (VRAM) once, then reads the drawing information from the VRAM so as to output it onto a display 28 (FIG. 2) as drawing data. The video controller also includes a digital-analog converter (DAC) used to convert digital video signals to analog video signals. Analog video signals are output to a CRT port (not illustrated) via signal lines.

The PCI bus 20 is connected to the card bus controller 30, the audio subsystem 32, the mini-PCI slot 36 respectively. The card bus controller 30 is a dedicated controller for connecting the bus signal of the PCI bus 20 to the interface connector (card bus) of the PCI card bus slot 38. A PC card 40 is loaded in the card bus slot 38. The PC card 40 disposed, for example, on the wall surface of the PC 12 body, conforms to the specifications (for example, "PC Card Standard 95") regulated by the PCMCIA (Personal Computer Memory Association)/JEIDA (Japan Electronic Industry Development Association).

The min-PCI slot 36 is connected to a network adapter 42 for connecting, for example, the computer system 10 to a network (ex., LAN).

The PCI bus 20 and the ISA bus 22 are connected to each other via an I/O bridge 44. The I/O bridge 44 has the bridge function to work between the PCI bus 20 and the ISA bus 22, the DMA controller function, the programmable interrupt controller (PIC) function, the programmable interval timer (PIT) function, the IDE (Integrated Drive Electronics) interface function, the USB (Universal Serial Bus) function, and the SMB (System Management Bus) interface function. The I/O bridge 44 also has a real time clock (RTC) in itself. The I/O bridge 44 may be a device (core chip) referred as PIIX4 of Intel Inc., USA.

The DMA controller function enables data to be transferred between peripheral devices (ex., FDD) and the main memory 16 without passing the CPU 14. The PIC function executes a predetermined program (interrupt handler) in response to an interrupt request (IRQ) from a peripheral device. The PIT function generates a timer signal at predetermined cycles and the cycle is programmable.

The IDE interface realized by the IDE interface function is connected to an IDE hard disk drive (HDD) 40 and an IDE CD-ROM drive 48 via the ATAPI (AT Attachment Packet Interface). Instead of the CD-ROM drive 48, another type IDE device, such as a DVD (Digital Video Disk or Digital Versatile Disk) drive, may be connected to the IDE interface. Such external storage devices as the HDD 46, the CD-ROM drive 48, etc. are housed, for example, in a place referred to as a "media bay" or "device bay" provided in the PC 12 body. Those external storage devices prepared as standard are attached in some cases so as to be replaced with other devices including an FDD and a battery pack and exclusively.

The I/O bridge 44 is provided with a USB port. This USB port is connected to, for example, a USB connector 50 provided on the wall surface of the PC 12, etc. The USB supports a function for connecting/disconnecting new peripheral devices (USB devices) while the PC is powered (hot plugging function) and a function for recognizing a newly connected peripheral device automatically and resetting the system configuration ((plug and play) function). One USB port can connect a total of 63 USB devices in a daisy chain connection manner. There are a variety of USB devices, such as keyboards, mice, joy sticks, scanners, printers, modems, display monitors, tablets, etc.

The I/O bridge 44 is also connected to an EEPROM 94 via the SM bus. The EEPROM 94 is a non-volatile memory for storing such information as user-registered passwords, supervisor passwords, product serial numbers, etc. The data stored in it can be rewritten electrically.

The ISA bus 22 is used to transfer data at a slower transfer rate than that of the PCI bus 20 (ex., bus width: 16 bits and max. data transfer rate: 4 MBps). The ISA bus is used for connecting a flash ROM 72 composed of a super I/O controller 70, an EEPROM, etc., a CMOS 74, a gate array logic 76, as well as such peripheral devices as a keyboard/mouse controller that operate at a comparatively slow transfer rate (not shown).

The super I/O controller 70 is connected to I/O ports 78. The super I/O controller 70 controls the floppy disk drive (FDD), as well as the input/output of parallel data (PIO) via a parallel port and the input/output of serial data (SIO) via a serial port.

The flash ROM 72 is a non-volatile memory for storing such programs as BIOS, etc. The data stored in it can be rewritten electrically. The CMOS 74 is composed of a volatile semiconductor memory connected to a backup power source. It is a non-volatile memory that functions as fast storing means.

The I/O bridge 44 is connected to a power supply circuit 54. The power supply circuit 54 includes such circuits as an AC/DC converter 62, as well as a DC/DC converter 66 for generating DC voltages of 5V, 3.3V, etc. used for the computer system 10. As shown in FIG. 4, the power supply circuit 54 is connected to the core chip that composes the I/O bridge 44 so as to enable the core chip to receive the signal PWR that denotes a command for supplying an electric power to the computer. Inside the core chip that composes the I/O bridge 44 are provided an internal register 68A for managing the power state of the computer system 10 and a logic (state machine) for managing the power state of the computer system 10 including the operation of the internal register (hereafter, the internal register and the logic will be referred to generically as a power supply manager 68). The power supply circuit 54 corresponds to the power module of the present invention.

The power supply manager 68 and the power supply circuit 54 exchange various signals between them. The power supply manager 68 recognizes the actual state of power supply to the computer system 10 from the power supply circuit 54 according to this exchange of signals, so that the power supply circuit 54 controls the power supply to the computer system 10 according to the command from the power supply manager 68. This power supply manager 68 is connected to a power switch 92 via a diode 90. The power supply manager 68 thus receives the signal PWRSW whose level is changed according to the operation of the power switch 92. The input side of the power supply manager 68 connected to the diode 90 is connected to the power supply VccSW to which an electric power is supplied constantly via a resistor 88, so that the level goes low when the power switch 92 is pressed and goes high when the power switch 92 is not pressed.

As shown in FIG. 1, the power supply circuit 54 has an AC plug 100 for relaying an AC power, so that the AC power is supplied to the full-wave rectifier 106 via a fuse 102 and a line filter 104. In this embodiment, the AC plug 100 is a three-pin type one, but two-pin type one may also be used. One output of the full-wave rectifier 106 is connected to a capacitor 108 and the other output is connected to the power factor correction circuitry (PFC circuit) 110. The other is connected to the primary side return. The PFC circuit 110 is provided with a resistor 112, a reactor 114 having a fly-back winding, diodes 116 and 124, a capacitor 118, a transistor switch 120, and a PFC controller 126.

The power factor correction circuitry 110 corresponds to the power factor correction circuitry of the present invention and the full-wave rectifier 106 or the combination of the line filter 104 and the full-wave rectifier 106 corresponds to the rectifier circuit of the present invention.

One output of the full-wave rectifier 106 is connected to the primary winding of a transformer 142 via a reactor of the reactor 114 having a fly-back winding and a diode 124. The transformer 142 is connected to the primary return via a transistor switch 144.

The other output of the full-wave rectifier 106 is connected to a PFC controller 126 via a resistor 112 and a transistor 132 belonging to a switching circuit 130 (to be described later). One end of the fly-back winding of the reactor 114 having the above fly-back winding is connected to the PFC controller 126 via a diode 116. The other end of the fly-back winding is connected to the primary return. The reactor output of the reactor 114 having a fly-back winding is connected to a transistor switch 120 and the gate of the transistor switch 120 is connected to the PFC controller 126. The source of the transistor switch 120 is connected to the primary return. And, the output of the reactor 114 having a fly-back winding is also connected to the plus (+) terminal of the capacitor 140 and the minus terminal is connected to the primary return. The PFC circuit 110 composed such way is used to improve the power factor of an entered full-wave rectified voltage. The operation of the PFC circuit 110 will be described later. The switching circuit 130 corresponds to the enabling means of the present invention.

One end of the secondary winding of the transformer 142 connected to the PFC circuit 110 is connected to the input of each of the regulators 150, 152, 154, and 156 via a diode 146 and the other end is connected to the secondary GND. The cathode of the diode 146 is connected to the plus of the capacitor 148. The minimum of the capacitor 148 is connected to the secondary GND of the capacitor 148. The other secondary GND of the secondary winding of the transformer 142 is isolated from the primary GND in the section up to the PFC circuit 110.

The regulator 150 keeps supply of an electric power to the computer 10. Its output is handled as a power supply VccSW. In addition, the regulators 152, 154, and 156 can receive the signal PWR, which is a command for a power supply to the computer. And, those regulators 152,154, and 156 supply the electric power to the computer 10 only when receiving the signal PWR respectively. This regulator 152 supplies a voltage of 5V and the regulator 154 supplies a voltage of 3.3V. The regulator 156 supplies a voltage of 12V.

The signal PWR corresponds to the command signal or shut-off signal of the present invention. The configuration beyond the transformer 142, that is, a section consisting of the transformer 142, the diode 146, and the capacitor 148 corresponds to the power supply means of the present invention. The power supply of the present invention may also include the regulators 150, 152,154, and 156 in the configuration beyond the transformer 142. The regulator 150 corresponds to the constant use power source of the present invention. The regulators 152, 154, and 156 correspond to the selective power source of the present invention.

The power supply circuit 54 in this embodiment is provided with a switching circuit 130. The switching circuit 130 includes a transistor 132, a photo-coupler 134, and an input terminal 136. The input terminal 136 is connected to the gate of the transistor 132 via the photo-coupler 134. The emitter of the transistor 132 is connected to the primary winding of the reactor 114 having a fly-back winding via a resistor 112. On the other hand, the collector of the transistor 132 is connected to the PFC controller 126. The input terminal 136 of the switching circuit 130 corresponds to the input means of the present invention.

The input terminal 136 corresponding to the above input means may receive an command signal output when an electric power supplied to the computer exceeds the first value. This first value is a value predetermined corresponding to a power consumption of the computer. The value denotes that the electric power supplied to the computer is increased, so that the improvement of power factor is required.

The shut-off signal used as the above command signal may be output when the electric power supplied to the computer is smaller than the second value. This second value is predetermined corresponding to the power consumption of the computer. The value denotes that the electric power supplied to the computer is reduced, thereby the improvement of the power factor is not required. The second value may be equal to or smaller than the first value.

To compose the computer system 10, many more electric circuits are required in addition to those shown in FIGS. 1 and 3. However, those electric circuits are already known well and they are not so important for describing the concept of the present invention. Description for them will therefore omitted in this specification. And, only some of the connections between hardware blocks in FIGS. 1 and 3 are illustrated so as to simplify the description in those figures.

Next, the operation of this embodiment will be described. At first, the peripheral operation of the PFC circuit 110 included in the above power supply circuit 54 will be described. In this case, it is premised that the transistor 132 of the switching circuit 130 is short-circuited. A sine wave AC voltage Vs ((A) shown in FIG. 5) entered via an AC plug from an AC power source becomes a voltage Vd ((B) shown in FIG. 5) after all waves are rectified in the full-wave rectifier 106, thereby the full-wave rectified voltage Vd between output terminals is smoothed by the capacitor 108. If the voltage is supplied to the transformer 142 without passing the PFC circuit 110 at this time, the primary side current is for supplying an electric power generated on the secondary winding is reduced as shown in FIG. 5(C), thereby the power factor is degraded.

The PFC circuit 110 generates an input voltage on the secondary winding of the reactor 114 having a fly-back winding via a resistor 112 and detects the DC-converted voltage with use of the rectifying diode 116 and the capacitor 118, thereby the PFC controller 126 turns on/off the reactor output of the reactor 114 having the fly-back winding and the transistor switch 120 connected to the primary return. By turning on/off the transistor switch 120 such way, the inter-terminal voltage of the capacitor 108 is applied to the primary winding of the transformer 142 intermittently. Then, the voltage generated on the secondary winding of the transformer 142 is converted to a DC voltage by the rectifying diode 146 and the capacitor 148, thereby the DC voltage is supplied to the regulators 150 to 156 as an output voltage Vo respectively.

In this case, primary side current Ip used for supplying an electric power generated on the secondary winding of the transformer 142 to the computer takes a current waveform as shown in FIG. 5(D) along the full-wave rectified voltage Vd and it has less high frequency components than the current waveform shown in FIG. 5(C). The power factor is thus improved.

the computer system 10 in this embodiment is a personal computer (PC) conforming to "Limits for Harmonic Current Emission" IEC1000-3-2, Class D. The PC is defined as shown in the following Table 1.

TABLE 1

| Harmonics Order n | Power Proportional Limit Value mA/W | Max. Allowable Harmonic Current A |
|---|---|---|
| 3 | 3.4 | 2.30 |
| 5 | 1.9 | 1.14 |
| 7 | 1.0 | 0.77 |
| 9 | 0.5 | 0.40 |
| 11 | 0.35 | 0.33 |
| 13 ≦ n ≦ 39 | 3.85/n | See Table 2 |

TABLE 2

| Harmonics Order n | Max. Allowable Harmonic Current A |
|---|---|
| Odd Number Harmonics | |
| 3 | 2.30 |
| 5 | 1.14 |
| 7 | 0.77 |
| 9 | 0.40 |
| 11 | 0.33 |
| 13 | 0.21 |
| 15 ≦ n ≦ 39 | 0.15 × (15/n) |
| Even Number Harmonics | |
| 2 | 1.08 |
| 4 | 0.43 |
| 6 | 0.30 |
| 8 ≦ n ≦ 40 | 0.23 × (8/n) |

If an AC 200V power source is used for a PC conforming to this harmonics guideline whose peripheral circuitry including the PFC circuit 110 requires a comparatively low power consumption, for example, a current of 10 mA, then the total power consumption of the PC will become 2 W (10 ma×200V). And, this 2 W power consumption is kept as long as the AC power is supplied from the AC plug 100.

Consequently, the computer system 10 in this embodiment is provided with a switching circuit 130. To shut off the power source of the computer system 10, that is, if the user operates the power switch 92 and the OS requests the PC to be shut down, the computer system 10 begins a preparatory processing for the shut-down. And, when this preparatory processing is ended, the OS executes the shut-down processing by writing specific information in a specific address in the internal register 68A of the power supply manager 68.

Consequently, the power supply manager 68 detects the shut-down of the computer system 10 and activates the signal PWR (low level) so as to be output to the power supply circuit 54.

With this output of the low level PWR signal, the regulators 152 to 156 are all stopped. And, the input terminal 136 of the switching circuit 130 also goes into the low level at the same time. In the photo-coupler 134, therefore, the diode emission and the transistor operation are stopped, that is, the transistor in the photo-coupler 134 is turned off. The transistor 132 connected to the photo-coupler 134 is thus turned off, thereby the electric power supply to the PFC controller 126 is shut off. And, the PFC controller 126 goes into the off state.

Consequently, the operation of the PFC circuit 110 is stopped when the power of the computer system 10 is shut off, thereby the power consumption of the PFC circuit 110 is reduced.

Furthermore, the computer system 10 in this embodiment conforms to the ACPI Standard and a plurality of power states (S0 to S5, G3) are defined as a power state as shown in Table 3.

TABLE 3

| Power State | APM | Actual State | Condition to Return to S0 |
|---|---|---|---|
| S0 | Operational | Operating | |
| S1 | Standby | Power off in some peripheral devices | A predetermined event occurs. |
| S2 | | | |
| S3 | Suspend | The operation state is stored in memory and peripheral devices are turned off. | A predetermined event occurs. |
| S4 | Hibernation | The operation state is stored in HDD and the power of the main section is turned off. | A predetermined event occurs. |
| S5 | SoftOFF | All power supplies except for that of the power supply manager of the core chip are off. | Power SW ON only |
| G3 | MechOFF | The power of the power supply manager is also turned off. | Power SW ON only |

The "APM" in Table 3 denotes the correspondence between each power supply state of S0 to S5 and G3 and each power supply state regulated by the APM (Advanced Power Management) Standard. In the computer system 10 in this embodiment, the signal line (PME: Power management Event (not illustrated)), which is part of the PCI bus 20, is used to restore the power state S0 from each of the power states S1, S2, and S3.

It is also possible to operate the photo-coupler 134 in conjunction with each of those power states. Concretely, instead of the above PWR signal, a signal for operating the photo-coupler 134 may be entered to the switching circuit 130 if the PFC circuit 110 is operated in each of the power states S0 to S5 and G3.

If a predetermined event occurrence for restoring the power state of the computer system 10 to S0 is detected when the PFC circuit 110 stops in any of the above power states, then a predetermined event occurrence to restore the power states to S0 is notified to the power manager 68 of the core chip (I/O bridge 44). Notified of this event occurrence, the power manager 68 executes a predetermined processing (for example, an output of an command signal to the power supply circuit 54) so as to restore the power state of the computer system 10 to S0. Consequently, the power manager 68 outputs a high level PWR signal, thereby the photo-coupler 134 and the transistor 132 are turned on respectively. As a result, the PFC controller 126 is actuated so as to improve the power factor. At the same time, the regulators 152 to 156 are actuated.

If the operation of the PFC circuit 110 is to be stopped while the power state of the computer system 10 is shifted to any of the above power states, the signal PWR is activated (low level) when an event for shifting the power state S0 (operating) to any of S1 to S5 and G3 is detected (for example, the power switch is turned off or the keyboard/mouse is operated so as to direct Power OFF in the software).

The PFC circuit 110 and the switching circuit 130 in this embodiment except for the reactor 114 can be integrated in one chip. It is thus possible to compose a power supply circuit that can reduce the power consumption with use of only a minimum external portion of the chip; there is no need to design the circuit configuration complicatedly.

The configuration including those PFC circuit 110 and the switching circuit 130 corresponds to the active filter of the present invention. And, those circuits 110 and 130 can be integrated in one chip so as to compose a filter module. Consequently, this embodiment can provide a filter module composed of one chip and enabled to improve the power factor and reduce the power consumption.

Although the power supply circuit 54 includes items from the AC plug 100 to the regulator 156 in the computer system 10 in the above configuration, the present invention is not limited only to that configuration; the power supply circuit 54 may be separated from the computer system 10 as a power module. For example, the power module may be composed of the fuse 102, the line filter 104, the full-wave rectifier 106, the capacitor 108, the PFC circuit 110, the switching circuit 130, the capacitor 140, the transformer 142, the transistor switch 144, the diode 146, the capacitor 148, the regulators 150, 152, 154, and 156 that are disposed in order following the AC plug 100.

The above items may further be excluded from the power module so that the power module is composed of the fuse 102, the line filter 104, the full-wave rectifier 106, the capacitor 108, the PFC circuit 110, the switching circuit 130, the capacitor 140, the transformer 142, the transistor switch 144, the diode 146, and the capacitor 148. And, the switching circuit may be separated and connected to the power module.

The transistor 132 included in the switching circuit 130 is just requested to switch on/off the PFC controller. The transistor 132 may also be replaced with another device. And, although a photo-coupler 134 is used so as to operate the transistor 132 in response to an input signal in the above embodiment, the photo-coupler 134 may be replaced with any device that can isolate the signal circuit from the primary circuit and it is not limited to the photo-coupler 134.

A chip other than the PIIX4 may also be used as the core chip including the power manager and it is not limited to PIIX4.

As described above, according to the present invention, the enabling means operates the power factor correction circuitry only when an command signal for supplying an electric power to the computer is entered. When no power supply to the computer is required, therefore, the power factor correction circuitry can be set in the reset state. The power consumption in the power factor correction circuitry can thus be reduced. The present invention can have such an excellent effect.

What is claimed is:

1. An active filter used for a computer, comprising:
a power factor correction circuitry for supplying an electric power rectified from an AC input to a primary winding of a transformer intermittently so as to supply an electric power generated on a secondary winding of said transformer to said computer, wherein the power factor correction circuitry comprises:
a resister coupled to said AC input,
a power factor correction controller,
a reactor with a fly-back winding coupled to said power factor correction controller and another winding coupled to said AC input, and
a transistor switch, wherein a drain of said transistor switch is coupled to said primary winding, a source of said transistor switch is coupled to said another winding, and a gate of said transistor switch is coupled to said power factor correction controller; and
an enabling device having an input device for receiving a command signal that indicates supply of an electric power to said computer and for enabling said power factor correction circuitry when receiving said command signal, said enabling device disables said power factor correction circuitry when receiving a shut-off signal as said command signal for shutting off supply of said electric power to said computer, wherein said enabling device comprises:
  a photo coupler coupled to said input device, and
  a transistor, wherein a gate of said transistor is coupled to said photo coupler, an emitter of said transistor is coupled to said resister, and a collector of said transistor is coupled to said power factor correction controller.

2. A filter module having said power factor correction circuitry and said enabling device according to claim 1 in one and the same chip.

3. A power module, comprising:
a rectifier circuit for rectifying an AC input;
a power factor correction circuitry for supplying a rectified electric power to a primary winding of a transformer intermittently, wherein the power factor correction circuitry comprises:
  a resister coupled to said AC input,
  a power factor correction controller,
  a reactor with a fly-back winding coupled to said power factor correction controller and another winding coupled to said AC input, and
  a transistor switch, wherein a drain of said transistor switch is coupled to said primary winding, a source of said transistor switch is coupled to said another winding, and a gate of said transistor switch is coupled to said power factor correction controller;
a power supply device including said transformer and used for supplying an electric power generated on a secondary winding of said transformer to said computer; and
an enabling device having an input device for receiving a command signal that indicates supply of an electric power to said computer and used for enabling said power factor correction circuitry when receiving said command signal, said enabling device disables said power factor correction circuitry when receiving a shut-off signal as said command signal for shutting off supply of said electric power to said computer, wherein said enabling device comprises:
  a photo coupler coupled to said input device, and
  a transistor, wherein a gate of said transistor is coupled to said photo coupler, an emitter of said transistor is coupled to said resister, and a collector of said transistor is coupled to said power factor correction controller.

4. A computer having a power module according to claim 3.

5. A computer, comprising:
a rectifier circuit for rectifying an AC input;
a power factor correction circuitry for supplying a rectified electric power to a primary winding of a transformer intermittently, wherein the power factor correction circuitry comprises:
  a resister coupled to said AC input,
  a power factor correction controller,
  a reactor with a fly-back winding coupled to said power factor correction controller and another winding coupled to said AC input, and
  a transistor switch, wherein a drain of said transistor switch is coupled to said primary winding, a source of said transistor switch is coupled to said another winding, and a gate of said transistor switch is coupled to said power factor correction controller;
a power supply device including a constant use power source for keeping supply of an electric power generated on a secondary winding of said transformer to said computer and a selective power source for supplying an electric power when receiving an enabling signal for supplying said electric power to said computer; and
an enabling device having an input device for receiving a command signal for indicating supply of an electric power to said computer and used for enabling said power factor correction circuitry when receiving said command signal, said enabling device disables said power factor correction circuitry when receiving a shut-off signal as said command signal for shutting off supply of said electric power to said computer, wherein said enabling device comprises:
  a photo coupler coupled to said input device, and
  a transistor, wherein a gate of said transistor is coupled to said photo coupler, an emitter of said transistor is coupled to said resister, and a collector of said transistor is coupled to said power factor correction controller.

6. An active filter used for said computer, comprising:
a power factor correction circuitry for supplying an electric power rectified from an AC input to a primary winding of a transformer intermittently so as to supply an electric power generated on a secondary winding of said transformer to said computer, wherein the power factor correction circuitry comprises:
  a resister coupled to said AC input,
  a power factor correction controller,
  a reactor with a fly-back winding coupled to said power factor correction controller and another winding coupled to said AC input, and
  a transistor switch, wherein a drain of said transistor switch is coupled to said primary winding, a source of said transistor switch is coupled to said another winding, and a gate of said transistor switch is coupled to said power factor correction controller; and
an enabling device having an input device for receiving a command signal output when an electric power supplied to said computer exceeds a first value and used for enabling said power factor correction circuitry when receiving said command signal, said enabling device disables said power factor correction circuitry when receiving a shut-off signal as said command signal, said shut-off signal being output when said electric power supplied to said computer is smaller than a second value, wherein said enabling device comprises:
  a photo coupler coupled to said input device, and
  a transistor, wherein a gate of said transistor is coupled to said photo coupler, an emitter of said transistor is coupled to said resister, and a collector of said transistor is coupled to said power factor correction controller.

7. A power module, comprising:
a rectifier circuit for rectifying an AC input;
a power factor correction circuitry for supplying a rectified electric power to a primary winding of a transformer intermittently, wherein the power factor correction circuitry comprises:
  a resister coupled to said AC input,
  a power factor correction controller, a reactor with a fly-back winding coupled to said power factor correction controller and another winding coupled to said AC input, and a transistor switch, wherein a drain of said transistor switch is coupled to said primary winding, a source of said transistor switch is coupled to said another winding, and a gate of said transistor switch is coupled to said power factor correction controller;

a power supply deice including said transformer and used for supplying an electric power generated on a secondary winding of said transformer to said computer; and an enabling device having an input device for receiving a command signal output when said electric power supplied to said computer exceeds a first value and used for enabling said power factor correction circuitry when receiving said command signal, said enabling device disables said power factor correction circuitry when receiving a shut-off signal as said command signal, said shut-off signal being output when an electric power supplied to said computer is smaller than a second value, wherein said enabling device comprises:

a photo coupler coupled to said input device, and a transistor, wherein a gate of said transistor is coupled to said photo coupler, an emitter of said transistor is coupled to said resister, and a collector of said transistor is coupled to said power factor correction controller.

8. A computer having said power module according to claim 7.

9. A computer, comprising:

a rectifier circuit for rectifying an AC input;

a power factor correction circuitry for supplying a rectified electric power to a primary winding of a transformer intermittently, wherein the power factor correction circuitry comprises:

a resister coupled to said AC input, a power factor correction controller, a reactor with a fly-back winding coupled to said power factor correction controller and another winding coupled to said AC input, and a transistor switch, wherein a drain of said transistor switch is coupled to said primary winding, a source of said transistor switch is coupled to said another winding, and a gate of said transistor switch is coupled to said power factor correction controller;

a power supply device including a constant use power source for keeping supply of an electric power generated on a secondary winding of said transformer to said computer and a selective power source for supplying an electric power when receiving an enabling signal for supplying said electric power to said computer; and an enabling device having an input device for receiving a command signal output when said electric power supplied to said computer exceeds a first value and used for enabling said power factor correction circuitry when receiving said command signal, said enabling device disables said power factor correction circuitry when receiving a shut-off signal as said command signal, said shut-off signal being output when said electric power supplied to said computer is smaller than a second value, wherein said enabling device comprises:

a photo coupler coupled to said input device, and a transistor, wherein a gate of said transistor is coupled to said photo coupler, an emitter of said transistor is coupled to said resister, and a collector of said transistor is coupled to said power factor correction controller.

* * * * *